UNITED STATES PATENT OFFICE.

OLIVER P. GREENSTREET, OF BAXTER SPRINGS, KANSAS, ASSIGNOR TO OKLAHOMA ZINC PRODUCTS CO., OF QUAPAW, OKLAHOMA, A CORPORATION OF OKLAHOMA.

SOLDERING-FLUX.

1,324,892. Specification of Letters Patent. Patented Dec. 16, 1919.

No Drawing. Application filed September 4, 1919. Serial No. 321,615.

*To all whom it may concern:*

Be it known that I, OLIVER P. GREENSTREET, a citizen of the United States, residing at Baxter Springs, in the county of Cherokee and State of Kansas, have invented certain new and useful Improvements in Soldering-Flux, of which the following is a specification.

This invention relates to an improved soldering flux, and it is an object of the invention to provide a novel and improved flux whereby zinc may be effectively soldered to similar or other metals and which flux may be successfully employed by tinners, jewelers and other artisans.

It is also an object of the invention to provide a novel and improved flux whereby corrosion or coloring is substantially eliminated after soldering and whereby the surfaces of the metals being soldered are broken up in a manner to assure closer adhesion and a smooth finish so that corrosion as a result of collected dirt and water is eliminated.

Another object of the invention is to provide a novel and improved flux which produces a strong acidic solution so that decomposition will become effective on a large number of metals so that my improved flux can be employed in connection with steel, cast iron, black iron, galvanized iron, nickel, copper, brass, tin, gold, silver, zinc and other metal.

With the above and other objects in view the invention consists in an improved flux, the several ingredients of which and the manner of admixing the same will now be more particularly referred to.

My improved flux is in the form of a fluid and in the manufacture thereof I apply to twenty gallons of commercial muriatic acid a quantity of chipped zinc and allowing the solution to stand, generally twenty-four hours, until the solution is loaded or will not have further effect upon the zinc or show further action thereon. As soon as the muriatic acid and zinc are combined and the chemical action starts and effervescence is well under way one quart of citronellol is added. This mixture is allowed to react in a combined solution or until diffusion is completed of the two chemicals with the zinc. The resultant solution is then drained off from the precipitate by a siphonic process and then treated with a copper sulfate solution. The copper sulfate solution is obtained by placing one gallon of chemically pure sulfuric acid and allowing to stand for a period of about twenty-four hours or until the solution becomes loaded with the copper in the chemical reaction and will have no further action thereon. As soon as this point is reached and the sulfuric acid and copper are thoroughly diffused the solution is siphoned off from the precipitate and the resultant fluid is then combined with the first named solution.

By use of the citronellol an oil effect is obtained which prevents rusting or further decomposition of the metal soldered and which is particularly true of the softer metals inasmuch as the strong acid solution which is necessary to break down the metal for the solder, is after such breaking down then neutralized to the extent that the acid has no further decomposing effect. By providing a neutral solution combined in a general solution, the necessary effects are obtained for soldering only and the further effects which are common in soldering by the old processes are thus eliminated, such as rust and coloring. The citronellol further causes the solder to flow easier and smoother and therefore quicker and by these added advantages the soldering operation is quickly completed and at an apparent low temperature thus avoiding much of the injury and burning of the metals, and especially softer metals.

The chemical reaction of the copper sulfate secures a more perfect "tinning" effect which is essentially important in soldering. The result of the better tinning is to obtain closer adhesion of the metals and of the solder with the metals and which can be obtained so perfectly with only muriatic acid and zinc solution.

The combined effect of the sulfuric acid and muriatic acid produces such a strong acid that decomposition will become effective on a larger number of metals and which is not possible with a weaker solution. By use of my improved fluid or flux as herein disclosed such metals as steel, cast iron, black iron, galvanized iron, nickel, copper, brass, tin, gold, silver and zinc are easily soldered. It has also been found that with my improved flux as herein embodied the resultant closer adhesion affords a smooth finish which allows water to run freer from the surface and thereby prevents corrosion from collected dirt and water and which collection generally occurs in connection with a rough finish.

I claim:

1. A soldering flux including zinc, muriatic acid, and citronellol.

2. A soldering flux including zinc, muriatic acid, citronellol, and a copper sulfate.

3. A soldering flux including muriatic acid, a maximum quantity of zinc which will be cut by the acid, citronellol, and a copper sulfate.

In testimony whereof I hereunto affix my signature.

OLIVER P. GREENSTREET.